Feb. 21, 1933.  O. D. CHAUVET  1,898,655
DIRECTION INDICATING SAFETY LIGHT
Filed May 31, 1930
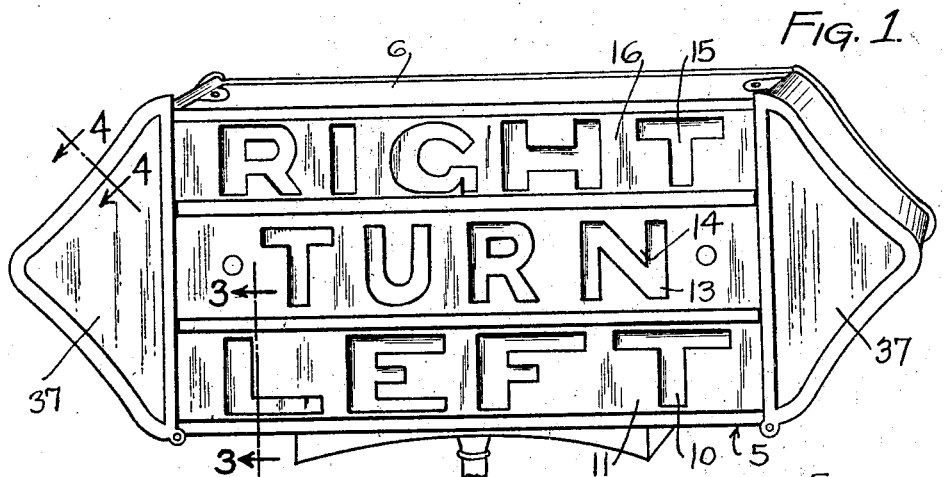
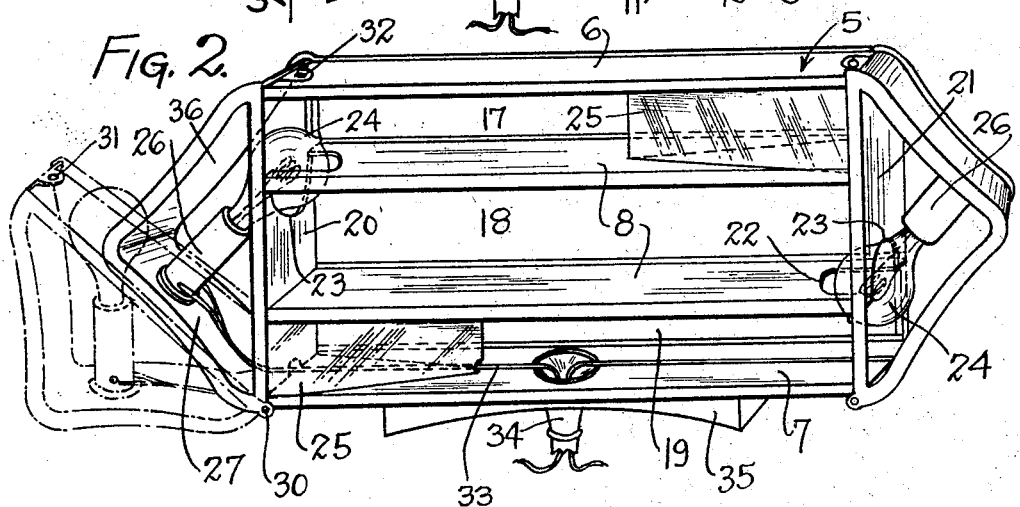
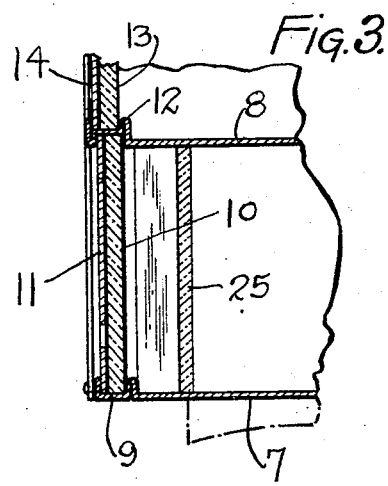
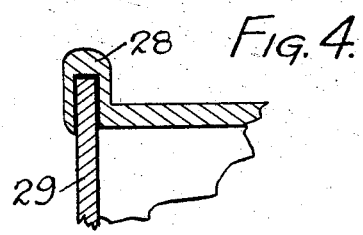
Inventor
OLIVER D. CHAUVET
By His Attorney
John J. Lynch Patented Feb. 21, 1933

1,898,655

UNITED STATES PATENT OFFICE

OLIVER D. CHAUVET, OF NORTH BERGEN, NEW JERSEY

DIRECTION INDICATING SAFETY LIGHT

Application filed May 31, 1930. Serial No. 458,637.

This invention relates to a direction indicating safety light and in particular to one which is adapted to show whether a right or a left turn is about to be made by the motorist.

The most important object of my invention is to provide a motor vehicle with a direction indicating safety light which may be placed on the front and rear of the vehicle which will eliminate the danger of a driver extending his hand out of the car to signal his desire to make a turn and permits the use of both hands on the controls of the car which makes for safety. The safety light will also eliminate the danger at night when a car comes to a sudden stop to make a turn without any warning to cars following closely, as in many instances, at night, the driver's hand when extended out of the vehicle cannot be seen. By turning on the right or left switch, as the case may be, one car following another is warned in due time and accidents are prevented.

A further object is to provide a safety light which will enable the traffic officer to know in which direction, the driver intends to turn and also to warn pedestrians at street corners the direction in which the vehicle is going to turn.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing:

Figure 1 is a view in perspective of a direction indicating safety light showing the same as it would appear both from the front of the vehicle and from the rear thereof.

Figure 2 is a view similar to Figure 1 with the glass closures of the light omitted to show the interior construction thereof, the hinge movement of one end of the casing being illustrated in outline.

Figure 3 is an enlarged section on the line 3—3 of Figure 1 showing the method of supporting the glass in the sides of the lamp, and Figure 4 is an enlarged section taken on the line 4—4 of Figure 1 showing the construction of the end of the casing.

Referring to the drawing in detail, 5 indicates in general a direction indicating safety light which consists of the upper and lower walls 6 and 7 respectively and the intermediate spaced walls 8. The construction is preferably of non-corrodible metal which will take a high polish and will fit in with the appearance of the vehicle.

As illustrated in Figure 3, the bottom panel 7 at its outer edges is crimped longitudinally as at 9 to provide a groove into which is slid the pane of ground glass 10 in front of which is disposed a contrasting colored stencil 11 out of which the word "Left" is punched so that when light shines on the glass 10, the word "Left" stands out prominently. Both the panels 8 are also provided with crimped edges 12 so that a slot is provided on top and beneath the panel 8 for the reception of the upper edge of the glass pane 10 and the reception of the lower edge of the intermediate pane of glass 13. This pane of glass 13 may be of ground glass or may be embossed to show the word "Turn" but in this instance, I have illustrated the use of a stencil 14 which is placed on the outside of the glass 13 and in which is cut, the word "Turn". The preferable construction, however, is to emboss in the glass 13, the word "Turn" and this glass will be colored red and will constitute the shaft of either a right or left turn indicating arrow depending upon the illumination of the compartments defined by the panels 6, 7 and 8.

The upper panel 6 constituting the top of the signal casing is grooved the same as the bottom panel 7 so that a pane of glass 15 is accommodated in front of which is disposed a stencil 16 having the word "Right" cut therein, the stencils 11 and 16 being substantially alike in color and providing a means whereby either the word "Right" or "Left" will stand out, depending upon which word is illuminated. The compartments defined by the panels 6, 7 and 8 are indicated as an upper compartment 17, an intermediate compartment 18 and a lower compartment 19, it being understood that the opposite sides of the signal are identical or, if desired, one of the sides may be closed, depending upon whether the signal is used at the front or the rear of the car. The opposite ends of the casing compartments are closed through the medium of end panels 20 and 21, the panels terminating so that the right hand end of the compartment 19 is open and the left hand end of the compartment 17 is open, the panels 20 and 21 being also cut out as at 23 as are the ends of the panels 8 adjacent said opening 23 to accommodate the light bulb 24, the cut out in the panels 8 being indicated by the numeral 22.

The right hand side of the upper compartment 17 is provided with a wedge shape mirror 25 as is the left hand end of the lower compartment 19 and both of these mirrors being disposed in the opposite end of the compartments from the electric light bulb 24, will reflect the light to the side walls of the compartments in which they are disposed so that the light is concentrated on the ground glass and the words cut out of the stencil are plainly visible.

In order that the lights may be readily changed, they are mounted in suitable sockets 26 which are secured in any suitable manner to the end panels 27 which are shaped to conform to the shape of an arrow head. These panels 27 are grooved at their edges as at 28 (see Figure 4), to hold the ground glass 29 which is red in color and substantially the same as the glass 13 employed to close the central compartment 18. The construction is the same at both ends of the signal casing with the exception that the light bulb is mounted on the diagonally opposite portion of the panel 27 from that illustrated at the left hand end of Figure 2. The grooved ends 28 of the panel 27 are hinged as at 30 to the lower edge of the casing, or more definitely, to the opposite ends of the lower panels 7 and these arrow head ends of the casing are maintained in closed position illustrated in Figures 1 and 2 through the medium of suitable tabs 31 which are secured to the upper panels 6 through the medium of a screw 32 which may be removed when it is necessary to replace the light or adjust any part of the casing. The light sockets 26 are connected through the medium of suitable wires 33 with a source of power and pass out through a suitable depending sleeve 34 secured to the bottom panel 7 of the casing. There is also provided on the under side of the bottom panel 7, a suitable pad 35 which conforms to the contour of the mudguard but the use of this pad is optional because it is understood that the light may be mounted at any point on the car or, if desired, may be built directly into the body both front and back to provide the proper signal.

When the motorist desires to make a right turn, he will move a switch designated "Right" that is disposed in any convenient location adjacent the steering wheel and the light 24 at the left hand side of the casing as illustrated in Figure 2, will be illuminated and will illuminate the compartments 17 and 18 and the arrow head portion of the casing 36 with the result that the word "Right" will be illuminated and the central red pane of glass 13 which will show the word "Turn" and also the left hand end or arrow head end of the casing 36 which is closed by the ground glass pane 37 with the result that the arrow will point to the right and the word "Right" will be illuminated. When the turn is to be made to the left, the right hand bulb in Figure 2 will be illuminated and the compartments 18 and 19 will be illuminated with the result that the arrow head end of the casing to the right, in Figure 1 will be illuminated as well as the central pane of ground glass 13 and also the lower compartment 19 to display the word "Left".

It is evident, therefore, that I have provided a direction indicating safety light which may be used front and back which automatically lights suitable compartments to indicate in which direction the turn is to be made, one which can be placed on the mudguard, the headlight or on a bracket extending in such a position as to be plainly seen from the front as well as from the rear of the vehicle.

It is evident, also that I have provided a light of the character referred to which safeguards the driver of a car driving alongside of the one on which the light is mounted where the driver alongside is at such an angle that he cannot see the light on the rear end of the car but can see the light on the front end of the car which gives him warning, if the driver of the vehicle carrying the direction indicating light is about to make a turn.

It is also evident that I have provided a safety light which indicates the desire of the driver of the vehicle in turning right or left which eliminates the necessity of putting the arm out of the window which is dangerous and which is undesirable in inclement weather and also permits the windows of the car to be kept closed in cold, dusty or rainy weather.

When my signal light is used at the front of the vehicle both the front and the rear face thereof will be employed. When, however, the signal is used at the rear of the vehicle, only the rear face thereof need be used, the front face being covered up in any suitable manner.

While I have illustrated and described my invention with some degree of particularity, I realize that in practice various alterations therein may be made without departing from the spirit of the invention or the scope of the appended claims.

What I claim is:—

1. In a device of the character described, an open faced signal casing, horizontal partitions dividing said casing to provide an upper, a lower and an intermediate compartment, end walls in the casing, an open faced end casing providing a compartment at each end of the signal casing, one of said end walls and said upper compartment forming partition, having adjoining openings, an illuminating means in one end casing but partially extending through said adjoining openings into the upper and intermediate compartments whereby said end casing and said upper and intermediate compartments may be simultaneously illuminated, said other end wall and lower compartment forming partition having adjoining openings, an illuminating means in said other end casing and partially extending through the openings into the lower and intermediate compartments whereby said end casing and the lower and intermediate compartments may be simultaneously illuminated, transparent closures for the open faces of all of the compartments and end casings, those in the end casings being in the shape of oppositely pointing arrow heads, the closure of the intermediate compartment forming a common shaft for said arrow heads, and the closures of the upper and lower compartments bearing direction turn indicia of a sense corresponding respectively with the arrow head with which it is illuminated.

2. In a device of the character described, an open faced signal casing, horizontal partitions dividing said casing to provide an upper, a lower and an intermediate compartment, end walls in the casing, an open faced end casing providing a compartment at each end of the signal casing, one of said end walls and said upper compartment forming partition, having adjoining openings, an illuminating means in one end casing but partially extending through said adjoining openings into the upper and intermediate compartments whereby said end casing and said upper and intermediate compartments may be simultaneously illuminated, said other end wall and lower compartment forming partition having adjoining openings, an illuminating means in said other end casing and partially extending through the openings into the lower and intermediate compartments whereby said end casing and the lower and intermediate compartments may be simultaneously illuminated, light reflecting members in the ends of said upper and lower compartments opposite the illuminating means that extend into said compartments, transparent closures for the open faces of all of the compartments and end casing, those in the end casings being in the shape of oppositely pointing arrow heads, the closure of the intermediate compartments forming a common shaft for said arrow heads, and the closures of the upper and lower compartments being direction turn indicia of a sense corresponding respectively with the arrow head with which it is illuminated.

Signed at 335 Broadway in the county of New York and State of New York this 22nd day of May, A. D. 1930.

OLIVER D. CHAUVET. [L. S.]